US008380420B2

(12) United States Patent
Takagi et al.

(10) Patent No.: US 8,380,420 B2
(45) Date of Patent: Feb. 19, 2013

(54) DRIVE CONTROL DEVICE FOR VEHICLE

(75) Inventors: Masashi Takagi, Nagoya (JP);
Motonari Ohbayashi, Nisshin (JP);
Yuki Minase, Toyota (JP); Shinya Kodama, Toyota (JP); Toshihiro Takagi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/504,037

(22) PCT Filed: Jul. 1, 2011

(86) PCT No.: PCT/JP2011/065142
§ 371 (c)(1),
(2), (4) Date: Apr. 25, 2012

(65) Prior Publication Data
US 2013/0006490 A1 Jan. 3, 2013

(51) Int. Cl.
*G06F 19/00* (2011.01)

(52) U.S. Cl. ....... 701/99; 701/29.1; 701/30.2; 701/31.2; 701/97; 701/98; 379/93.06; 379/93.08; 379/93.09; 379/93.28; 379/93.37; 379/202.01; 379/442; 375/143; 375/145; 375/222; 375/223; 375/226; 370/260; 370/342; 370/471; 370/496; 370/522; 318/139; 318/432; 340/8.1; 342/450; 710/301

(58) Field of Classification Search ................ 701/29.1, 701/30.2, 31.2, 32.1, 23.9, 33.1, 35, 97, 98, 701/99; 379/93.06, 93.08, 93.09, 93.28, 379/93.37, 202.01, 442; 375/143, 145, 222, 375/223, 226; 370/260, 342, 471, 496, 522, 370/495; 455/426, 426.1, 456.2; 340/8.1, 340/257; 180/178, 199, 282; 318/139, 432
See application file for complete search history.

(56) References Cited

U.S. PATENT DOCUMENTS

| 5,457,363 A * | 10/1995 | Yoshii et al. ................... 318/432 |
| 6,199,001 B1 * | 3/2001 | Ohta et al. ....................... 701/51 |
| 6,366,846 B2 * | 4/2002 | Iriyama ........................... 701/97 |
| 6,971,969 B2 * | 12/2005 | Kitagawa et al. .................. 477/3 |
| 7,416,511 B2 * | 8/2008 | Nishina et al. ..................... 477/5 |
| 2001/0047236 A1 * | 11/2001 | Iriyama ........................... 701/97 |

FOREIGN PATENT DOCUMENTS

JP          61-190135 A      8/1986
(Continued)

*Primary Examiner* — McDieunel Marc
(74) *Attorney, Agent, or Firm* — Sughrue Mion, PLLC

(57) ABSTRACT

Precise operation of an accelerator operating member (7) is more difficult to perform in a reversing operation of a vehicle (1) as compared with an advancing operation. Therefore, behavior of the vehicle (1) is not smooth and thus tends to be unnatural. In the reversing operation of the vehicle (1), driving force output from an internal combustion engine (2) is limited in accordance with vehicle acceleration (D). At this time, it is possible to regulate the driving force of the vehicle (1) in conformity to the actual operation of the accelerator operating member (7) by the driver. In addition, limitation of the driving force is not executed in the advancing operation of the vehicle (1). At this time, the vehicle (1) can be driven in a state in which the driving force is comparatively small. Therefore, it is possible to prevent the behavior of the vehicle (1) from being unnatural. Accordingly, limitation of the driving force output from the internal combustion engine (2) can be properly carried out in accordance with the moving direction of the vehicle (1).

4 Claims, 3 Drawing Sheets

FOREIGN PATENT DOCUMENTS

| | | |
|---|---|---|
| JP | 1-95551 U | 6/1989 |
| JP | 7-133733 A | 5/1995 |
| JP | 2000-328976 A | 11/2000 |
| JP | 2009-126352 A | 6/2009 |
| JP | 2009-264128 A | 11/2009 |
| JP | 2010-59820 A | 3/2010 |

* cited by examiner

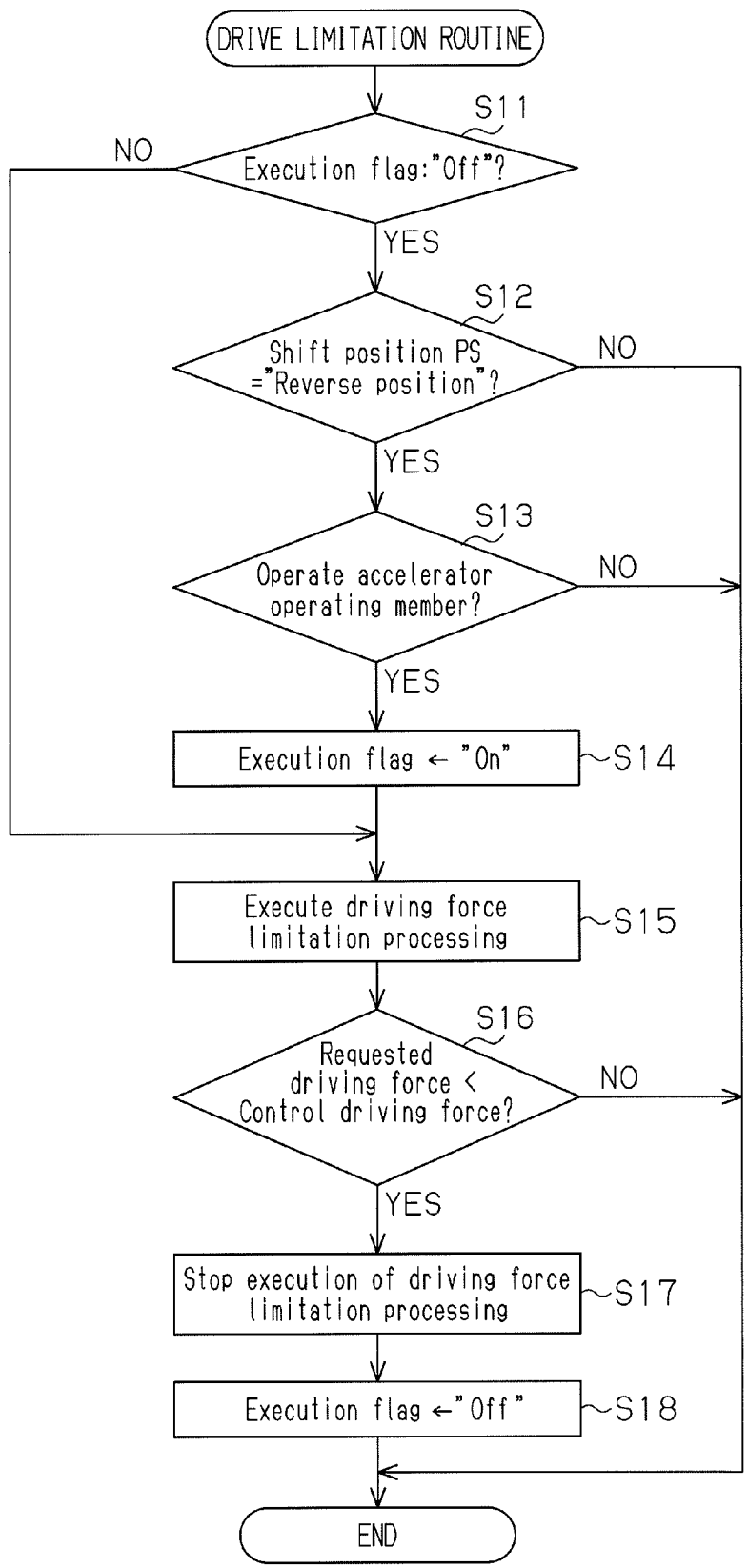

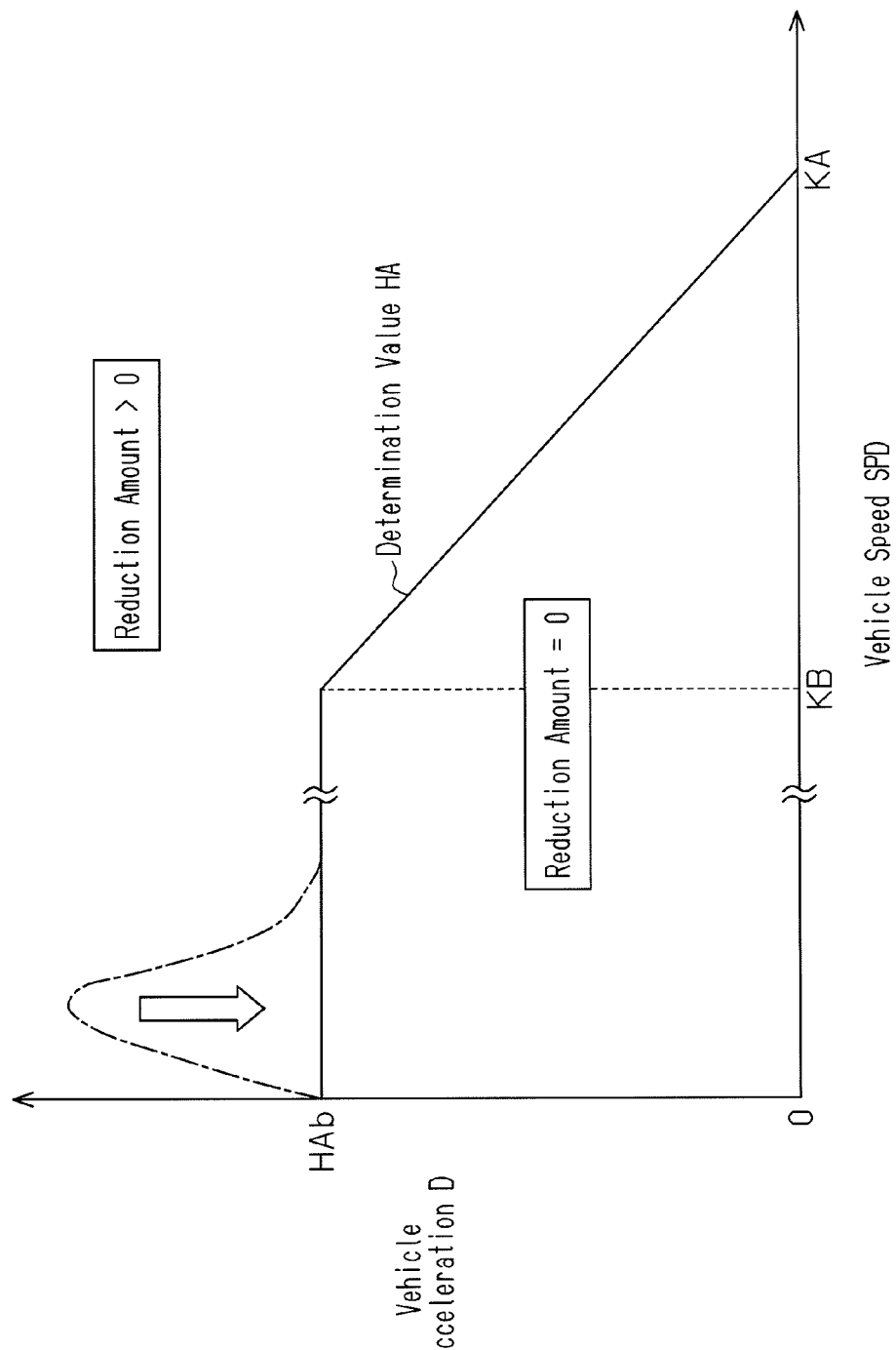

DRIVE CONTROL DEVICE FOR VEHICLE

CROSS REFERENCE TO RELATED APPLICATIONS

This application is a National Stage of International Application No. PCT/JP2011/065142, filed on Jul. 1, 2011, the contents of all of which are incorporated herein by reference in their entirety.

FIELD OF THE INVENTION

The present invention relates to a drive control device for a vehicle.

BACKGROUND OF THE INVENTION

A vehicle such as an automobile is provided with a prime mover such as an internal combustion engine or an electric motor as a drive source. Moreover, the vehicle is provided with an accelerator operating member such as an accelerator pedal. Driving force output from the prime mover is regulated in accordance with an operation of the accelerator operating member by a driver, and is transmitted to the wheels to propel the vehicle.

Patent Document 1 discloses a device for reducing driving force output from a prime mover when the operating force or operating speed of an accelerator operating member exceeds a predetermined level in the vehicle. Referring to the device, the driving force of the vehicle is limited when the accelerator operating member is suddenly operated, for example, when the driver strongly depresses the accelerator pedal.

PRIOR ART DOCUMENT

Patent Document

Patent Document 1: Japanese Laid-Open Patent Publication No. 61-190135

SUMMARY OF THE INVENTION

In an advancing operation of a vehicle, usually, the driver sitting on a seat takes a natural posture. On the other hand, in a reversing operation of the vehicle, the driver often takes an unnatural posture, for example, the driver twists his (her) body from a sitting condition on the seat and thus views a rear part of the vehicle. For this reason, in the reversing operation of the vehicle, it is more difficult to carry out precise operation of the accelerator operating member and to finely regulate the driving force output from the prime mover and transmitted to the wheels as compared with the case in the advancing operation. Accordingly, the behavior of the vehicle is not smooth and thus tends to be unnatural.

If the driving force of the vehicle is limited in the reversing operation of the vehicle in the same manner as in the advancing operation without taking the above described situation into consideration, the limitation is not always carried out properly and thus the driver might feel uncomfortable, resulting in an adverse impact on drivability.

Accordingly, it is an objective of the present invention to provide a drive control device for a vehicle that can properly limit driving force output from a prime mover.

In order to achieve the above objective, a drive control device for a vehicle according to the present invention limits driving force output from a prime mover serving as a drive source of the vehicle in accordance with driving state of the vehicle, and at the same time, regulates the driving force in accordance with operating mode of an accelerator operating member. The drive control device executes the limitation of the driving force such that the degree of limitation is higher in a reversing operation of the vehicle as compared with the case in an advancing operation of the vehicle. According to the device, the degree of the limitation of the driving force of the vehicle is decreased in the advancing operation, in which precise operation of the accelerator operating member can be carried out. Therefore, the driving force of the vehicle is regulated to relatively accurately reflect the actual operation of the accelerator operating member by a driver. In addition, in the reversing operation, in which delicate operation of the accelerating operating member is difficult to perform, the degree of the limitation of the driving force of the vehicle is increased. Therefore, it is possible to drive the vehicle with small driving force. Therefore, it is possible to gently vary behavior of the vehicle and to prevent the behavior from being unnatural. According to the device, thus, the driving force output from the prime mover can be properly limited in accordance with the moving direction of the vehicle.

In a preferred aspect, the driving state of the vehicle represents acceleration of the vehicle. In other words, in the device, the degree of limitation of the driving force output from the prime mover is varied in accordance with the acceleration of the vehicle. In this case, in the execution of the limitation of the driving force, it is possible to increase the degree of limitation of the driving force output from the prime mover as the acceleration of the vehicle is increased. When the acceleration of the vehicle is high, the degree of the limitation of the driving force of the vehicle can be increased to gently vary the behavior of the vehicle. In addition, when the acceleration of the vehicle is comparatively low, it is possible to decrease the degree of the limitation of the driving force of the vehicle. Therefore, it is possible to avoid a situation in which the driving force of the vehicle is limited uselessly despite low acceleration of the vehicle and little variation in behavior. Therefore, it is possible to easily ensure the driving force for propelling the vehicle at that time.

In an aspect of the present invention, in the reversing operation of the vehicle, the driving force output from a prime mover serving as a drive source of the vehicle is limited in accordance with the acceleration of the vehicle, and at the same time, is regulated in accordance with an operating mode of the acceleration operating member. According to the device, in the reversing operation, in which precise operation of the accelerator operating member is difficult to perform, the driving force of the vehicle is limited in accordance with the acceleration of the vehicle. Therefore, it is possible to drive the vehicle with a small driving force. Therefore, it is possible to gently vary behavior of the vehicle in the reversing operation and to prevent the behavior from being unnatural. Accordingly, it is possible to properly limit the driving force output from the prime mover.

In an aspect of the present invention, the degree of the limitation of the driving force is set to be "0" when the acceleration of the vehicle is lower than a determination value, and the degree of the limitation of the driving force is set to be greater than "0" when the acceleration of the vehicle is equal to or higher than the determination value.

Preferably, the determination value is set variably in accordance with moving speed of the vehicle.

In an aspect of the present invention, the degree of the limitation of the driving force is set to be higher than "0" irrespective of a relationship between the acceleration of the vehicle and the determination value when the moving speed of the vehicle is equal to or higher than a reference speed.

BRIEF DESCRIPTION OF THE DRAWINGS

FIG. 2 is a flowchart showing a procedure for executing a drive limitation routine; and FIG. 3 is a graph showing a relationship among vehicle acceleration, vehicle speed and a determination value.

DETAILED DESCRIPTION OF THE PREFERRED EMBODIMENTS

Figure 1:
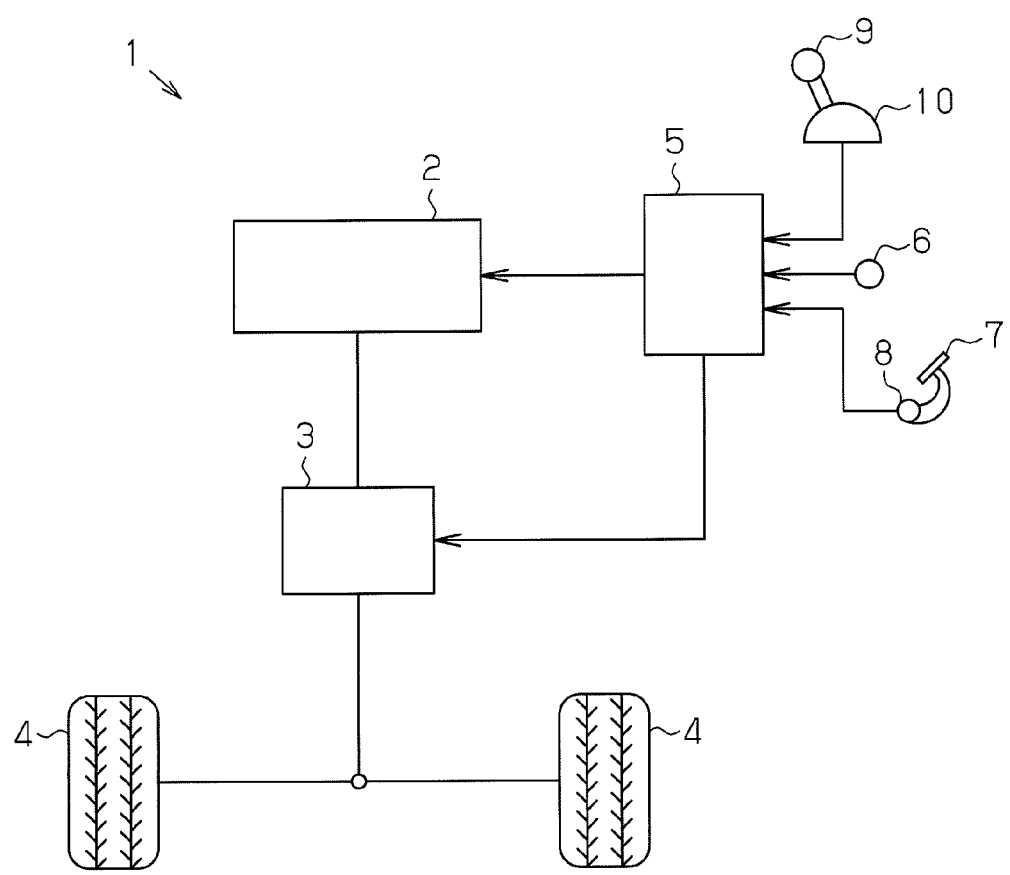
FIG. 1 is a schematic diagram showing the structure of a drive control device for a vehicle according to one embodiment of the present invention.

One embodiment of a drive control device for a vehicle according to the present invention will be described below.

As shown in FIG. 1, a vehicle 1 is provided with an internal combustion engine 2 serving as a drive source. When driving force output from the internal combustion engine 2 is transmitted to wheels 4 through a gearbox 3 or the like, the wheels 4 rotate so that the vehicle 1 moves. The gearbox 3 has a plurality of gears, and the combination of the gears can be changed in order to form one of a plurality of predetermined speeds. Moreover, the gearbox 3 can also transmit the driving force output from the internal combustion engine 2 to the wheels 4 or block the transmission of the driving force.

The vehicle 1 is provided with an electronic control device 5 for executing various control operations related to the internal combustion engine 2, the gearbox 3 and the like. The electronic control device 5 functions as a regulating section and a limiting section. Various sensors, for example, a vehicle speed sensor 6 for detecting the moving speed (a vehicle speed SPD) of the vehicle 1, an accelerator position sensor 8 for detecting an operating amount of an accelerator operating member 7 (an accelerator operating amount ACC), a shift position sensor 10 for outputting a signal corresponding to an operating position of a shift lever 9 (a shift position PS) and the like are connected to the electronic control device 5. For the accelerator operating member 7, it is possible to employ an accelerator pedal or an accelerator lever. A driving circuit for driving the internal combustion engine 2, a driving circuit for driving the gearbox 3 and the like are connected to the electronic control device 5.

The electronic control device 5 regulates driving force output from the internal combustion engine 2 in accordance with the accelerator operating amount ACC or the like. Moreover, the electronic control device 5 switches the speed of the gearbox 3, and transmits and blocks driving force between the internal combustion engine 2 and the wheels 4 based on the accelerator operating amount ACC, the vehicle speed SPD and the shift position PS. The shift lever 9 is switched into any of the operating positions, that is, the parking position, reverse position, neutral position and drive position. A mode for driving the gearbox 3 for each operating position of the shift lever 9 will be listed below.

When the shift lever 9 is switched into the parking position, rotation of the wheels 4 is prohibited by engagement of the gears in the gearbox 3, and furthermore, the gearbox 3 is driven through the electronic control device 5 in order to block the transmission of the driving force output from the internal combustion engine 2 to the wheels 4. When the shift lever 9 is switched into the neutral position, the prohibition of the rotation of the wheels 4 by the engagement of the gears in the gearbox 3 is released and the gearbox 3 is driven through the electronic control device 5 in order to block the transmission of the driving force output from the internal combustion engine 2 to the wheels 4. When the shift lever 9 is switched into the drive position, the gearbox 3 is driven through the electronic control device 5 in order to transmit the driving force output from the internal combustion engine 2 to the wheels 4 in a normal rotating direction. At this time, the vehicle 1 is brought into a state in which an advancing operation is enabled. When the shift lever 9 is switched into the reverse position, the gearbox 3 is driven through the electronic control device 5 in order to transmit the driving force output from the internal combustion engine 2 to the wheels 4 in a reverse rotating direction. At this time, the vehicle 1 is brought into a state in which a reversing operation is enabled.

In the device according to the present embodiment, in the reversing operation of the vehicle 1, the driving force output from the internal combustion engine 2 is limited in accordance with acceleration (vehicle acceleration D) of the vehicle 1. In the advancing operation of the vehicle 1, the limitation of the driving force in accordance with the vehicle acceleration D is not executed. Moreover, the vehicle acceleration D is calculated based on a detection signal of the vehicle speed sensor 6. In the present embodiment, thus, the limitation of the driving force is executed such that the degree of the limitation of the driving force output from the internal combustion engine 2 is higher in the reversing operation of the vehicle 1 as compared with the case in the advancing operation of the vehicle 1.

Description will be given to a function obtained by thus limiting the driving force output from the internal combustion engine 2.

In the advancing operation of the vehicle 1, the posture of the driver is natural. On the other hand, in the reversing operation of the vehicle 1, the driver often takes an unnatural posture, for example, the driver twists his (her) body in a sitting condition on the seat, thereby taking a twisted posture to see the rear part of the vehicle. In the reversing operation of the vehicle 1, therefore, it is more difficult to carry out precise operation of the accelerator operating member 7 and to finely regulate driving force transmitted from the internal combustion engine 2 to the wheels 4 as compared with the case in the advancing operation. Accordingly, the behavior of the vehicle 1 is not smooth and thus tends to be unnatural.

In the present embodiment, in the advancing operation of the vehicle 1, that is, when the behavior of the vehicle 1 does not tend to be unnatural because delicate operation of the accelerator operating member 7 can be carried out, the limitation of the driving force output from the internal combustion engine 2 is not executed. For this reason, the driving force output from the internal combustion engine 2 is prevented from being limited unnecessarily in conformity to the actual operation of the accelerator operating member 7 by the driver, and at the same time, the driving force of the vehicle 1 is regulated.

In addition, in the reversing operation of the vehicle 1, that is, when the behavior of the vehicle 1 tends to be unnatural because it is difficult to carry out delicate operation of the accelerator operating member 7, the limitation of the driving force output from the internal combustion engine 2 is executed. For this reason, the vehicle 1 is driven in a state in which the driving force output from the internal combustion engine 2 is comparatively small. Therefore, a change in the behavior of the vehicle 1 is made gentle at this time so that the behavior is prevented from being unnatural.

According to the present embodiment, thus, the limitation of the driving force output from the internal combustion engine 2 is properly carried out in conformity to the moving direction of the vehicle 1. Therefore, it is possible to prevent the driver from feeling uncomfortable both in the advancing operation and reversing operations of the vehicle 1. Consequently, drivability is improved.

A procedure for executing a drive limitation routine including processing for limiting driving force output from the internal combustion engine 2 (driving force limitation processing) will be described below in detail with reference to a flowchart of FIG. 2. A serial processing shown in the flowchart is executed cyclically by a time interruption at every predetermined time through the electronic control device 5, for example.

As shown in FIG. 2, in the routine, it is first determined whether an execution flag is turned OFF or not (Step S11). The execution flag is turned ON when execution of the driving force limitation processing (Step S15) is started, and is turned OFF when the execution of the driving force limitation processing is stopped. In the processing of the Step S11, it is determined whether the execution of the driving force limitation processing is stopped or not based on the operating state of the execution flag.

If the execution flag is turned OFF (Step S11: YES), it is assumed that the driving force limitation processing is not being executed at this time and it is determined whether the execution of the driving force limitation processing needs to be started or not. When the following Condition 1 and Condition 2 are satisfied together, it is determined that the execution of the driving force limitation processing needs to be started.

Condition 1: The shift position PS is the reverse position (Step S12: YES).

Condition 2: The accelerator operating member 7 is being operated (Step S13: YES). More specifically, the accelerator operating amount ACC is larger than a predetermined value.

When at least one of the Condition 1 and the Condition 2 is not satisfied (Step S12: NO, or Step S13: NO), it is determined that the execution of the driving force limitation processing should not be started, and the present processing is temporarily suspended without execution of the following processing.

On the other hand, when the same routine is then executed repetitively so that both Conditions 1 and 2 are satisfied (Step S12: YES, and Step S13: YES), the execution flag is turned ON (Step S14) and the execution of the driving force limitation processing (Step S15) is started. A procedure for executing the driving force limitation processing will be described below in detail. Thereafter, the driving force limitation processing is continuously executed until the execution flag is turned OFF (Step S11: NO).

During the execution of the driving force limitation processing, processing related to the end of the driving force limitation processing is executed.

In detail, it is determined whether or not driving force required by the driver, that is, requested driving force that is the driving force output from the internal combustion engine 2 in accordance with the accelerator operating amount ACC is smaller than a control driving force that is driving force obtained after the limitation through the driving force limitation processing (Step S16). If the operation of the accelerator operating member 7 by the driver is released to enter the OFF operation state so that the accelerator operating amount ACC is "0", it is determined that the requested driving force is smaller than the control driving force.

If the requested driving force is equal to or greater than the control driving force (Step S16: NO), the execution of the driving force limitation processing is not stopped but continuously carried out.

Then, if the processing of the same routine is executed repetitively so that the requested driving force is smaller than the control driving force (Step S16: YES), the execution of the driving force limitation processing is stopped ($S_{17}$) and the execution flag is turned OFF (Step S18), and the present processing is temporarily suspended. Subsequently, the limitation of the driving force output from the internal combustion engine 2 is stopped so that the driving force is regulated to be coincident with the requested driving force based on the accelerator operating amount ACC.

A mode for limiting the driving force in the driving force limitation processing (the processing of the Step S15 in FIG. 2) will be described below in detail with reference to FIG. 3.

In the processing, the limitation of the driving force output from the internal combustion engine 2 is executed, that is, the driving force is reduced by a reduction amount. When the reduction amount is increased, the degree of limitation of the driving force through the driving force limitation processing is increased, accordingly. More specifically, the reduction amount is increased so that the degree of limitation of the driving force output from the internal combustion engine 2 is increased when the vehicle acceleration D is higher. More specifically, as shown in FIG. 3, for example, when the vehicle acceleration D is smaller than a determination value HA, the reduction amount is set to be 0 so that the degree of the limitation of the driving force is set to be 0. That is, at this time, the driving force output from the internal combustion engine 2 is not limited. On the other hand, when the vehicle acceleration D is equal to or greater than the determination value HA, the reduction amount is set to be greater than 0 so that the degree of the limitation of the driving force output from the internal combustion engine 2 is greater than 0.

In the present embodiment, thus, the degree of the limitation of the driving force is varied in accordance with the vehicle acceleration D. For example, the degree of limitation is increased if the vehicle acceleration D is higher when limiting the driving force output from the internal combustion engine 2 in the reversing operation of the vehicle 1. For this reason, when there is a possibility that the behavior of the vehicle 1 might be unnatural because of the high vehicle acceleration D, it is possible to increase the degree of limitation of the driving force output from the internal combustion engine 2 in order to gently vary the behavior of the vehicle 1. In addition, also in the reversing operation of the vehicle 1, the driving force output from the internal combustion engine 2 is not limited when the vehicle acceleration D is comparatively low. Therefore, it is possible to prevent a situation in which the driving force is limited uselessly despite a high possibility that the change in behavior of the vehicle 1 might be reduced because of the low vehicle acceleration D. Accordingly, it is possible to easily ensure the driving force for propelling the vehicle at that time.

The limitation of the driving force output from the internal combustion engine 2 can be executed not only in accordance with the vehicle acceleration D, but also in accordance with the operating state of the accelerator operating member 7 (for example, the operating amount or the operating speed). Even if the operating state of the accelerator operating member 7 is identical, the behavior of the vehicle 1 is varied depending on the vehicle speed SPD, the inclination of the road surface or the like. For this reason, if the driving force output from the internal combustion engine 2 is limited in accordance with the operating mode of the accelerator operating member 7, there is a possibility that the driving force might not be limited properly. For example, the driving force is unnecessarily limited on an upward slope requiring great driving force or is not limited on a downward slope which does not require great driving force.

In this respect, in the present embodiment, the limitation of the driving force output from the internal combustion engine 2 is executed in accordance with the vehicle acceleration D.

Therefore, it is possible to execute the limitation in accordance with the actual behavior of the vehicle 1. Thus, it is possible to properly execute the limitation of the driving force output from the internal combustion engine 2 while preventing a variation in the behavior of the vehicle 1 from being caused by the driving environment of the vehicle 1.

Moreover, the determination value HA to be used for a comparison with the vehicle acceleration D in the driving force limitation processing is variably set in accordance with the vehicle speed SPD. More specifically, as shown in FIG. 3, when the vehicle speed SPD is lower than a predetermined speed KB (for example, several kilometers per hour), a predetermined value HAb, which is a certain value, is set as the determination value HA. When the vehicle speed SPD is equal to or greater than the predetermined speed KB and is lower than a reference speed KA (for example, several tens kilometers per hour), a value that is decreased gradually with an increase in the vehicle speed SPD is set as the determination value HA. In addition, when the vehicle speed SPD is equal to or higher than the reference speed KA, 0 is set as the determination value HA. In the present embodiment, an optimum relationship between the vehicle speed SPD and the determination value HA is previously obtained based on results of experiments or simulations and is stored in the electronic control device 5. In the driving force limitation processing, the determination value HA is obtained from the relationship based on the vehicle speed SPD.

In the case in which the vehicle 1 is started on an upward slope or the case in which the vehicle 1 is caused to get over a step, comparatively great driving force is required for stoppage of the moving operation or low-speed moving operation of the vehicle 1.

In the present embodiment, the driving force output from the internal combustion engine 2 is not limited until the vehicle acceleration D reaches a predetermined HAb in the stoppage or the low-speed running operation of the vehicle 1. At this time, the degree of the limitation of the driving force output from the internal combustion engine 2 is comparatively low. Therefore, it is possible to obtain a comparatively great driving force. Accordingly, it is possible to ensure a sufficient driving force when the vehicle 1 is started on an upward slope or gets over a step.

In the drive limitation processing, when the driving force output from the internal combustion engine 2 is limited, there is set, as the reduction amount, a value that can basically set the vehicle acceleration D to be the determination value HA. In the driving force limitation processing, moreover, in the case in which the vehicle acceleration D exceeds the determination value HA so that the limitation of the driving force is started, the vehicle acceleration D changes, for instance, the vehicle acceleration D is once increased and is then decreased gradually, and is stabilized at the determination value HA as shown in an alternate long and short dash line of FIG. 3 illustrating an example of change of the vehicle acceleration D. In detail, the reduction amount in the driving force limitation processing is set such that the vehicle acceleration D thus makes the change.

Assuming that the limitation of the driving force output from the internal combustion engine 2 is executed such that the vehicle acceleration D and the determination value HA are always coincident with each other, a situation can occur in which the driving force is limited and is not increased when a driver operates the accelerator operating member 7 to increase the driving force. For this reason, there is a high possibility that the driver might feel uncomfortable. In the present embodiment, when the vehicle acceleration D is increased in the reversing operation of the vehicle 1 so that limitation of the driving force output from the internal combustion engine 2 is executed, a temporary increase in the vehicle acceleration D is noticed by the driver. Therefore, it is possible to cause the driver to recognize that the driving force is limited. Accordingly, it is possible to prevent the driver from feeling uncomfortable due to the situation. Consequently, drivability is improved.

In addition, if the vehicle speed SPD is equal to or higher than the predetermined speed KB, the driving force output from the internal combustion engine 2 is limited in a situation in which the vehicle acceleration D is lower as compared with the case in which the vehicle speed SPD is lower than the predetermined speed KB. Therefore, it is possible to increase the degree of limitation of the driving force output from the internal combustion engine 2 at this time. Consequently, it is possible to gently vary the behavior of the vehicle 1.

When the vehicle speed SPD is equal to or higher than the reference speed KA, the degree of limitation of the driving force output from the internal combustion engine 2 is higher than 0 in accordance with the vehicle acceleration D irrespective of the relationship between the vehicle acceleration D and the determination value HA. In other words, the reduction amount has a greater value than 0 in accordance with the vehicle acceleration D in order to cause the degree of limitation of the driving force higher than 0. Therefore, it is possible to suppress the increase in the vehicle speed SPD at this time.

According to the present embodiment described above in detail, the following advantages are obtained.

(1) The limitation of the driving force output from the internal combustion engine 2 is executed such that the degree of limitation of the driving force is higher in the reversing operation of the vehicle 1 than the case of the advancing operation of the vehicle 1. For this reason, the limitation of the driving force output from the internal combustion engine 2 is not executed in the advancing operation of the vehicle 1 in which precise operation of the accelerator operating member 7 can be carried out. It is possible to regulate the driving force of the vehicle 1 in conformity to the actual operation of the accelerator operating member 7 by the driver. In addition, the limitation of the driving force output from the internal combustion engine 2 is executed in the reversing operation of the vehicle 1 in which precise operation of the accelerator operating member 7 is difficult to perform. Therefore, it is possible to drive the vehicle 1 in a state in which the driving force is comparatively small and to gently vary the behavior of the vehicle 1, thereby preventing the behavior from being unnatural. Accordingly, the limitation of the driving force output from the internal combustion engine 2 can be properly carried out in accordance with the moving direction of the vehicle 1.

(2) When the driving force output from the internal combustion engine 2 is limited in the reversing operation of the vehicle 1, the degree of limitation of the driving force is varied in accordance with the vehicle acceleration D. When there is a possibility that the behavior of the vehicle 1 might be unnatural because of the high vehicle acceleration D, it is possible to increase the degree of limitation of the driving force in order to gently vary the behavior of the vehicle 1. In addition, when the vehicle acceleration D is comparatively low even in the reversing operation of the vehicle 1, the limitation of the driving force is not executed. Therefore, it is possible to avoid a situation in which the driving force is limited uselessly despite a high possibility that the change in behavior of the vehicle 1 might be reduced because of the low vehicle acceleration D. Accordingly, it is possible to easily ensure the driving force for propelling the vehicle at that time.

The above embodiment may be modified as follows, for example.

The determination value HA may be set to be a certain value irrespective of the vehicle speed SPD.

The degree of limitation of the driving force output from the internal combustion engine 2 may be varied in accordance with the driving state of the vehicle 1 other than the vehicle acceleration D. For example, it may be varied in accordance with only the vehicle speed SPD or the accelerator operating amount ACC.

In the embodiment, the limitation of the driving force output from the internal combustion engine 2 is not executed in the advancing operation of the vehicle 1 but in only the reversing operation of the vehicle 1. Instead, the limitation of the driving force output from the internal combustion engine 2 may be executed both in the advancing and reversing operations of the vehicle 1, and furthermore, the degree of limitation may be increased more greatly in the reversing operation of the vehicle 1 as compared with the case in the advancing operation of the vehicle 1. According to the device, in the advancing operation, in which precise operation of the accelerator operating member 7 can be carried out, the degree of limitation of the driving force of the vehicle 1 is decreased. Therefore, the driving force of the vehicle 1 is regulated to relatively accurately reflect the actual operation of the accelerator operating member 7 by the driver. In addition, in the reversing operation, in which delicate operation of the accelerator operating member 7 is difficult to perform, the degree of limitation of the driving force of the vehicle 1 is increased. Therefore, it is possible to drive the vehicle 1 with small driving force. Accordingly, the limitation of the driving force output from the internal combustion engine 2 can also be properly carried out in accordance with the moving direction of the vehicle 1 by the device.

The present invention is not restricted to a vehicle provided with an internal combustion engine as a drive source but can be applied to a vehicle provided with a prime mover as a drive source, for example, a vehicle provided with an electric motor as a drive source or a vehicle provided with an internal combustion engine and an electric motor as drive sources.

DESCRIPTION OF THE REFERENCE NUMERALS

1 . . . vehicle, 2 . . . internal combustion engine, 3 . . . gearbox, 4 . . . wheels, 5 . . . electronic control device, 6 . . . vehicle speed sensor, 7 . . . accelerator operating member, 8 . . . accelerator position sensor, 9 . . . shift lever, 10 . . . shift position sensor.

The invention claimed is:

1. A drive control device for a vehicle, comprising:
a regulating section for regulating driving force output from a prime mover serving as a drive source of a vehicle in accordance with an operating mode of an accelerator operating member; and
a limiting section for limiting the driving force in accordance with acceleration of the vehicle and limiting the driving force such that the degree of the limitation is higher in a reversing operation of the vehicle as compared with a case in an advancing operation of the vehicle, wherein the limiting section sets the degree of the limitation of the driving force to be "0" when the acceleration of the vehicle is lower than a determination value, and the limiting section sets the degree of the limitation of the driving force to be greater than "0" when the acceleration of the vehicle is equal to or higher than the determination value, and wherein the limiting section sets, as the determination value, a value that is decreased gradually with an increase in the vehicle speed.

2. A drive control device for a vehicle, comprising:
a regulating section for regulating driving force output from a prime mover serving as a drive source of a vehicle in accordance with an operating mode of an accelerator operating member; and
a limiting section for limiting the driving force in accordance with acceleration of the vehicle in a reversing operation of the vehicle, wherein the limiting section sets the degree of the limitation of the driving force to be "0" when the acceleration of the vehicle is lower than a determination value, and the limiting section sets the degree of the limitation of the driving force to be greater than "0" when the acceleration of the vehicle is equal to or higher than the determination value, and wherein the limiting section sets, as the determination value, a value that is decreased gradually with an increase in the vehicle speed.

3. The drive control device for a vehicle according to claim 1, wherein the limiting section sets the degree of the limitation of the driving force to be higher than "0" irrespective of a relationship between the acceleration of the vehicle and the determination value when the moving speed of the vehicle is equal to or higher than a reference speed.

4. The drive control device for a vehicle according to claim 2, wherein the limiting section sets the degree of the limitation of the driving force to be higher than "0" irrespective of a relationship between the acceleration of the vehicle and the determination value when the moving speed of the vehicle is equal to or higher than a reference speed.

* * * * *